United States Patent
Coonce et al.

(10) Patent No.: US 12,053,945 B2
(45) Date of Patent: Aug. 6, 2024

(54) THERMOFORMED ABRASION-RESISTANT MULTILAYER OPTICAL FILM AND METHOD OF MAKING THE SAME

(71) Applicant: 3M INNOVATIVE PROPERTIES COMPANY, St. Paul, MN (US)

(72) Inventors: Benjamin R. Coonce, South St. Paul, MN (US); Richard J. Pokorny, Maplewood, MN (US); Thomas P. Klun, Lakeville, MN (US); Chunjie Zhang, Shoreview, MN (US); Gregg A. Ambur, River Falls, WI (US); Benjamin G. Sonnek, Mahtomedi, MN (US); Daniel J. Richter, Hudson, WI (US); Jung-Sheng Wu, Woodbury, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 797 days.

(21) Appl. No.: 17/059,843

(22) PCT Filed: May 30, 2019

(86) PCT No.: PCT/IB2019/054491
§ 371 (c)(1),
(2) Date: Nov. 30, 2020

(87) PCT Pub. No.: WO2019/234560
PCT Pub. Date: Dec. 12, 2019

(65) Prior Publication Data
US 2021/0221080 A1 Jul. 22, 2021

Related U.S. Application Data
(60) Provisional application No. 62/683,949, filed on Jun. 12, 2018, provisional application No. 62/680,424, filed on Jun. 4, 2018.

(51) Int. Cl.
*B29D 11/00* (2006.01)
*B29C 51/00* (2006.01)
(Continued)

(52) U.S. Cl.
CPC ...... *B29D 11/00788* (2013.01); *B29C 51/002* (2013.01); *B29C 51/10* (2013.01);
(Continued)

(58) Field of Classification Search
None
See application file for complete search history.

(56) References Cited

U.S. PATENT DOCUMENTS

| 4,262,072 A | 4/1981 | Wendling | |
|---|---|---|---|
| 4,929,506 A * | 5/1990 | Kerr, III | C08J 7/043 428/424.4 |

(Continued)

FOREIGN PATENT DOCUMENTS

| CN | 2393118 | 8/2000 |
|---|---|---|
| CN | 1267256 A | 9/2000 |

(Continued)

OTHER PUBLICATIONS

Wikipedia contributors. "Spherical cap." Wikipedia, The Free Encyclopedia. Wikipedia, The Free Encyclopedia, Jul. 6, 2023. Web. Nov. 16, 2023. (Year: 2023).*

(Continued)

*Primary Examiner* — Benjamin A Schiffman
(74) *Attorney, Agent, or Firm* — Julie Lapos-Kuchar; Bradford Wright

(57) ABSTRACT

A method of making a shaped abrasion-resistant multilayer optical film includes providing a curable composition comprising, based on the total weight of components a) to d) components: a) 87 to 96 weight percent of urethane (meth) acrylate compound having an average (meth)acrylate func- (Continued)

tionality of 2 to 4.8; b) 2 to 12.5 weight percent of (meth) acrylate monomer having a (meth)acrylate functionality of 1 to 2, wherein the (meth)acrylate monomer does not comprise a urethane (meth)acrylate compound; optionally c) 0.5 to 2 weight percent of silicone (meth)acrylate; and d) optional effective amount of photoinitiator. The curable composition is coated onto an MOF. Optionally, the curable composition to is at least partially dried. Next, the curable composition or the at least partially dried curable composition is at least partially cured to provide an abrasion-resistant multilayer optical film. Lastly, the abrasion-resistant multilayer optical film is thermoformed using a female mold having a mold surface. At least a portion of the mold surface has a radius of curvature of 58 to 76 mm and a maximum depth of 13 to 20 mm.

16 Claims, 1 Drawing Sheet

(51) Int. Cl.
| | |
|---|---|
| B29C 51/10 | (2006.01) |
| B29C 51/14 | (2006.01) |
| B29C 51/46 | (2006.01) |
| C08G 18/24 | (2006.01) |
| C08G 18/67 | (2006.01) |
| C08G 18/78 | (2006.01) |
| C09D 175/14 | (2006.01) |
| C09D 175/16 | (2006.01) |
| G02B 1/08 | (2006.01) |
| G02B 1/14 | (2015.01) |
| B29C 51/02 | (2006.01) |
| B29K 33/00 | (2006.01) |
| B29K 75/00 | (2006.01) |
| B29L 11/00 | (2006.01) |

(52) U.S. Cl.
CPC ............. *B29C 51/14* (2013.01); *B29C 51/46* (2013.01); *B29D 11/00009* (2013.01); *B29D 11/0073* (2013.01); *C08G 18/246* (2013.01); *C08G 18/6715* (2013.01); *C08G 18/7831* (2013.01); *C09D 175/14* (2013.01); *C09D 175/16* (2013.01); *G02B 1/08* (2013.01); *G02B 1/14* (2015.01); *B29C 51/02* (2013.01); *B29K 2033/12* (2013.01); *B29K 2075/00* (2013.01); *B29K 2995/0034* (2013.01); *B29L 2011/0016* (2013.01)

(56) References Cited

U.S. PATENT DOCUMENTS

| | | | |
|---|---|---|---|
| 5,233,465 A | 8/1993 | Wheatley | |
| 5,360,659 A | 11/1994 | Arends | |
| 5,662,951 A | 9/1997 | Greshes | |
| 5,882,774 A | 3/1999 | Jonza | |
| 6,045,894 A | 4/2000 | Jonza | |
| 6,049,419 A | 4/2000 | Wheatley | |
| 6,065,836 A | 5/2000 | Krishnan | |
| 6,074,579 A | 6/2000 | Greshes | |
| 6,083,335 A * | 7/2000 | Scullin | B29C 45/14811 |
| | | | 156/196 |
| 6,180,033 B1 | 1/2001 | Greshes | |
| 6,228,499 B1 | 5/2001 | Nakauchi | |
| 6,328,466 B1 | 12/2001 | Kadota | |
| 6,367,930 B1 | 4/2002 | Santelices | |
| 6,368,699 B1 | 4/2002 | Gilbert | |
| 6,391,400 B1 * | 5/2002 | Russell | B32B 17/10036 |
| | | | 359/359 |
| 6,451,414 B1 | 9/2002 | Wheatley | |
| 6,531,230 B1 | 3/2003 | Weber | |
| 6,650,473 B2 | 11/2003 | Nakagoshi | |
| 6,667,095 B2 | 12/2003 | Wheatley | |
| 6,676,859 B2 | 1/2004 | Hartley | |
| 6,697,195 B2 | 2/2004 | Weber | |
| 6,783,349 B2 | 8/2004 | Neavin | |
| 6,788,463 B2 | 9/2004 | Merrill | |
| 6,801,360 B2 | 10/2004 | Phillips | |
| 6,814,896 B2 | 11/2004 | Bhalakia | |
| 6,845,700 B2 * | 1/2005 | Capdeboscq | B26D 7/20 |
| | | | 29/895.23 |
| 6,886,937 B2 | 5/2005 | Moravec | |
| 6,927,900 B2 | 8/2005 | Liu | |
| 6,951,681 B2 | 10/2005 | Hartley | |
| 7,025,458 B2 | 4/2006 | Vu | |
| 7,038,745 B2 | 5/2006 | Weber | |
| 7,048,997 B2 | 5/2006 | Bhalakia | |
| 7,077,985 B2 | 7/2006 | Maki | |
| 7,271,951 B2 | 9/2007 | Weber | |
| 7,289,257 B1 * | 10/2007 | Nakagoshi | G02C 7/12 |
| | | | 351/159.61 |
| 7,500,749 B2 | 3/2009 | Vu | |
| 7,601,290 B2 * | 10/2009 | Nagasawa | B29C 45/14819 |
| | | | 264/328.17 |
| 7,629,379 B2 | 12/2009 | Wilson | |
| 7,632,568 B2 | 12/2009 | Padiyath | |
| 7,648,234 B2 | 1/2010 | Welchel | |
| 7,652,736 B2 | 1/2010 | Padiyath | |
| 7,718,264 B2 | 5/2010 | Klun | |
| 7,791,687 B2 | 9/2010 | Weber | |
| 7,901,074 B2 | 3/2011 | Yamamoto | |
| 7,952,805 B2 | 5/2011 | McGurran | |
| 8,008,139 B2 * | 8/2011 | Lim | H01L 27/1288 |
| | | | 438/479 |
| 8,029,705 B2 | 10/2011 | Bhalakia | |
| 8,062,444 B2 | 11/2011 | Begon | |
| 8,066,371 B2 | 11/2011 | Miyoshi | |
| 8,120,730 B2 | 2/2012 | Weber | |
| 8,398,234 B2 | 3/2013 | Wang | |
| 8,441,724 B2 | 5/2013 | You | |
| 8,798,332 B2 | 8/2014 | Otis | |
| 8,857,981 B2 | 10/2014 | Pletcher | |
| 8,985,763 B1 | 3/2015 | Etzkorn | |
| 8,999,509 B2 * | 4/2015 | Port | C09D 133/08 |
| | | | 528/65 |
| 9,017,819 B2 | 4/2015 | Kues | |
| 9,075,189 B2 * | 7/2015 | West | B29D 11/00865 |
| 9,110,245 B2 * | 8/2015 | Derks | G02B 5/3041 |
| 9,266,998 B2 | 2/2016 | Kues | |
| 9,301,879 B2 * | 4/2016 | McCulloch | A42B 3/245 |
| 9,414,746 B2 * | 8/2016 | Bergman | G06F 3/013 |
| 9,435,924 B2 * | 9/2016 | Yu | C09D 4/00 |
| 9,523,865 B2 * | 12/2016 | Pletcher | G02C 11/10 |
| 9,557,568 B1 * | 1/2017 | Ouderkirk | G03B 21/28 |
| 9,739,916 B2 * | 8/2017 | Weber | G02B 5/282 |
| 9,808,375 B2 * | 11/2017 | Cornelius | G02B 27/0006 |
| 9,859,659 B2 * | 1/2018 | Resendez | H01R 13/514 |
| 9,885,885 B2 * | 2/2018 | Weber | G02B 5/283 |
| 10,054,803 B2 * | 8/2018 | Wold | G02C 7/104 |
| 10,195,799 B2 * | 2/2019 | Kim | B29D 11/00644 |
| 10,513,626 B2 * | 12/2019 | Walker, Jr. | C09D 127/16 |
| 10,723,888 B2 * | 7/2020 | Jing | C09D 7/61 |
| 11,065,855 B2 * | 7/2021 | Klun | G02B 5/26 |
| 11,156,757 B2 * | 10/2021 | Haag | G02F 1/133615 |
| 11,543,572 B2 * | 1/2023 | Jennings | G02B 5/305 |
| 2004/0080062 A1 | 4/2004 | Pope | |
| 2004/0105072 A1 | 6/2004 | Qin | |
| 2004/0126587 A1 | 7/2004 | Maki | |
| 2005/0275943 A1 | 12/2005 | Sugimara | |
| 2006/0249880 A1 | 11/2006 | Nagasawa et al. | |
| 2009/0004478 A1 * | 1/2009 | Baetzold | C09D 175/16 |
| | | | 264/269 |
| 2009/0269568 A1 | 10/2009 | Kuhlmann | |
| 2010/0003523 A1 | 1/2010 | Sharygin | |
| 2010/0047974 A1 | 2/2010 | Lim | |
| 2011/0096289 A1 | 4/2011 | Onizawa | |
| 2011/0102891 A1 | 5/2011 | Derks | |
| 2011/0183120 A1 | 7/2011 | Sharygin | |

(56) References Cited

U.S. PATENT DOCUMENTS

| | | | |
|---|---|---|---|
| 2012/0202911 A1* | 8/2012 | Mitsuoka | C08G 18/678 522/64 |
| 2012/0276373 A1 | 11/2012 | Port | |
| 2013/0091623 A1 | 4/2013 | McCulloch | |
| 2013/0164541 A1* | 6/2013 | Suwa | C08F 290/067 427/520 |
| 2013/0344290 A1 | 12/2013 | Yu | |
| 2014/0004304 A1 | 1/2014 | Yu | |
| 2014/0192311 A1 | 7/2014 | Pletcher | |
| 2014/0374402 A1 | 12/2014 | Cornelius | |
| 2015/0015847 A1 | 1/2015 | Bergman | |
| 2015/0131047 A1 | 5/2015 | Saylor | |
| 2015/0146166 A1 | 5/2015 | Weber | |
| 2015/0268396 A1 | 9/2015 | Weber | |
| 2016/0077361 A1 | 3/2016 | Wold | |
| 2016/0164227 A1 | 6/2016 | Resendez | |
| 2018/0279471 A1* | 9/2018 | Chen | B32B 27/08 |

FOREIGN PATENT DOCUMENTS

| | | |
|---|---|---|
| CN | 101747123 A | 6/2010 |
| CN | 102083896 A | 6/2011 |
| CN | 103597377 A | 2/2014 |
| CN | 103923291 A | 7/2014 |
| CN | 105848866 A | 8/2016 |
| CN | 107868598 A | 4/2018 |
| CN | 108025531 A | 5/2018 |
| DE | 19645432 | 5/1998 |
| EP | 0324081 | 7/1989 |
| JP | H 07-331160 A | 12/1995 |
| JP | 2000-206805 A | 7/2000 |
| JP | 2005330439 A * | 12/2005 |
| JP | 2008-063395 A | 3/2008 |
| JP | 2014-200943 | 10/2014 |
| WO | WO 95-017303 | 6/1995 |
| WO | WO 99-039224 | 8/1999 |
| WO | WO 03-078148 | 9/2003 |
| WO | WO 2005-123370 | 12/2005 |
| WO | WO 2008-013320 | 1/2008 |
| WO | WO 2018-163009 | 9/2008 |
| WO | WO 2009-004265 | 1/2009 |
| WO | WO 2012-033483 | 3/2012 |
| WO | WO 2014-110101 | 7/2014 |
| WO | WO 2014-210249 | 12/2014 |
| WO | WO 2015-080908 | 6/2015 |
| WO | WO 2017-039714 | 3/2017 |
| WO | WO 2017-056005 | 4/2017 |
| WO | WO 2017-113269 | 7/2017 |
| WO | WO 2018-147935 | 8/2018 |

OTHER PUBLICATIONS

Polycarbonates, Wikipedia, [ retrieved from http://en.wikipedia.org/wiki/Polycarbonate on Jan. 30, 2021].

Polypropylene, The definitive users guide and databook, 1998, pp. 223-235.

Wolf, "A technology decision: adhesive lamination or extrusion coating/lamination?", TAPPI, Apr. 18-21, 2020, Albuquerque, NM, 19 pages.

International Search report for PCT International Application No. PCT/IB2019/054491 mailed on Oct. 21, 2019, 4 pages.

* cited by examiner

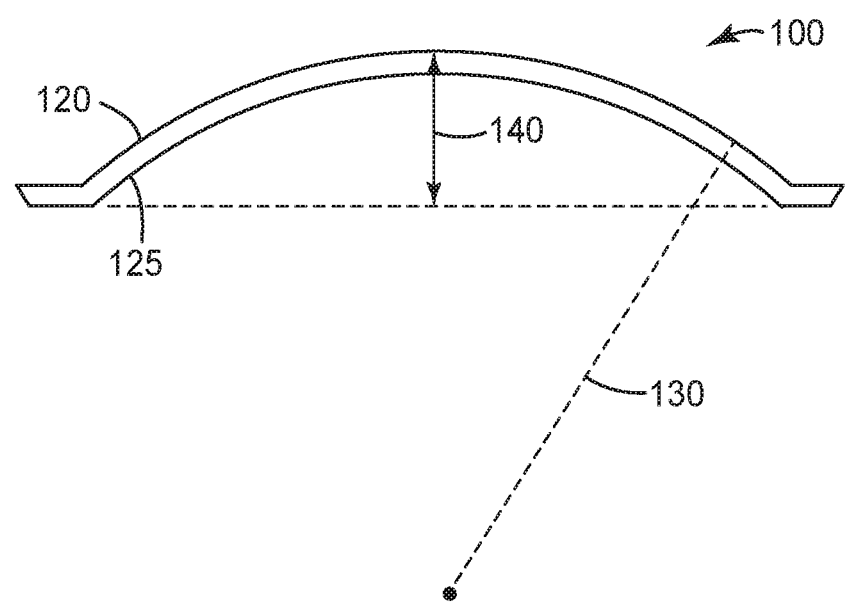

THERMOFORMED ABRASION-RESISTANT MULTILAYER OPTICAL FILM AND METHOD OF MAKING THE SAME

TECHNICAL FIELD

The present disclosure broadly relates to reflective polarizer films having an abrasion-resistant coating, lens assemblies including one or more such reflective polarizer films, and methods of making the same.

BACKGROUND

Multilayer Optical Films (MOFs) include individual microlayers having different refractive index characteristics so that some light is reflected at interfaces between adjacent microlayers. The microlayers are sufficiently thin so that light reflected at a plurality of the interfaces undergoes constructive or destructive interference to give the multilayer optical film the desired reflective or transmissive properties. For multilayer optical films designed to reflect light at ultraviolet, visible, or near-infrared wavelengths, each microlayer generally has an optical thickness (a physical thickness multiplied by refractive index) of less than about 1 micron. Thicker layers are also typically included, such as skin layers at the outer surfaces of the multilayer optical film, or protective boundary layers (PBLs) disposed within the multilayer optical films, that separate coherent groupings (sometimes referred to "packets") of microlayers. However, even with co-extruded outer skin layers, MOFs are prone to surface damage such as gouging and scuffing that may occur during handling and use. Such damage can detract from performance and/or aesthetic appearance of the MOF.

SUMMARY

The problem of surface damage with MOFs may be addressed by providing an abrasion-resistant layer onto one or more outer surfaces of the MOFs.

In some applications, for example, those applications in which an MOF must achieve a complex 3-dimensional (3-D) shape it may be desirable to shape the MOF, for example, by thermoforming. If the abrasion-resistant layer is chemically crosslinked, then problems with stress cracking may occur during thermoforming.

In particular, the present inventors have discovered that abrasion resistant layers that are useful in thermoforming operations using a male mold insert are not suitable for thermoforming using a corresponding female mold insert. For example, using an 8 base lens male mold insert it was possible to use a higher degree of chemical crosslinking than with a corresponding 8 base female mold insert. Further, the failure modes were different for the different mold insert types, with stress cracks forming at the periphery of the male mold insert thermoformed film (which may be removable by trimming), whereas stress cracks form in the center of the female mold insert thermoformed film, rendering them useless.

Advantageously, the present disclosure provides abrasion-resistant layer compositions for MOFs that, after coating on an MOF and curing, can be successfully thermoformed using female mold inserts (e.g., according to an 8 base lens geometry curved surface).

In one aspect, the present disclosure provides a method of making a shaped abrasion-resistant multilayer optical film, the method comprising steps:

i) providing a curable composition comprising components:
  a) 87 to 96 weight percent of urethane (meth)acrylate compound having an average (meth)acrylate functionality of 2 to 4.8, based on the total weight of components a) to d);
  b) 2 to 12.5 weight percent of (meth)acrylate monomer having a (meth)acrylate functionality of 1 to 2, based on the total weight of components a) to d), wherein the (meth)acrylate monomer does not comprise a urethane (meth)acrylate compound;
  c) optional 0.5 to 2 weight percent of silicone (meth)acrylate, based on the total weight of components a) to d);
  d) optional effective amount of photoinitiator;
  e) optional inorganic nanoparticles; and
  f) optional solvent;
ii) coating the curable composition onto a major surface of a multilayer optical film;
iii) optionally at least partially drying the curable composition to provide an at least partially dried curable composition;
iv) at least partially curing the curable composition or the at least partially dried curable composition to provide an abrasion-resistant multilayer optical film; and
v) thermoforming the abrasion-resistant multilayer optical film using a female thermoforming mold having a mold surface, wherein at least a portion of the mold surface has a radius of curvature of 58 to 76 millimeters and a maximum depth of 13 to 20 mm, to provide the shaped abrasion-resistant multilayer optical film.

In another aspect, the present disclosure provides a shaped abrasion-resistant multilayer optical film made by a method according to the present disclosure.

Shaped abrasion-resistant multilayer optical films prepared according to the present disclosure provide a satisfactory level of abrasion resistance while still being formable by thermoforming using a female mold.

As used herein:

The term "male mold insert" refers to a mold insert that is outwardly convex in the region of the mold insert that is used to form the desired molded part shape (i.e., exclusive of flash).

The term "female mold insert" refers to a mold insert that is inwardly concave in the region of the mold insert that is used to form the desired molded part shape (i.e., exclusive of flash).

The prefix "(meth)acryl" refers to methacryl and/or acryl;

The phrase "average (meth)acrylate functionality" refers to the average number of (meth)acrylate groups per molecule.

The phrase "urethane (meth)acrylate compound" means a compound having at least one (preferably at least 2, 3, 4, or more) carbamate group (i.e., —NHC(=O)O—) and at least one (meth)acryl group.

By definition, the total of weight percentages of the total of all ingredients in a composition equals 100 weight percent.

Features and advantages of the present disclosure will be further understood upon consideration of the detailed description as well as the appended claims.

BRIEF DESCRIPTION OF THE DRAWINGS

FIG. 1 is a schematic top view of a shaped abrasion-resistant multilayer optical film according to the present disclosure.

Repeated use of reference characters in the specification and drawings is intended to represent the same or analogous features or elements of the disclosure. It should be understood that numerous other modifications and embodiments can be devised by those skilled in the art, which fall within the scope and spirit of the principles of the disclosure. The FIGURE may not be drawn to scale.

DETAILED DESCRIPTION

Abrasion-resistant multilayer optical films according to the present disclosure can be made by coating a curable composition onto a major surface of an MOF. The curable composition comprises components, based on the total weight of components a) to d): a) 87 to 96 weight percent of urethane (meth)acrylate compound having an average (meth)acrylate functionality of 2 to 4.8; b) 2 to 12.5 weight percent (meth)acrylate monomer having a (meth)acrylate functionality of 1 to 2, wherein the (meth)acrylate monomer does not comprise a urethane (meth)acrylate compound; c) optional 0.5 to 2 weight percent of silicone (meth)acrylate; d) optional effective amount of photoinitiator; e) optional inorganic nanoparticles; and f) optional solvent.

If solvent is present, the coated curable composition is optionally (but typically) at least partially dried to provide an at least partially dried curable composition. The curable composition, or the at least partially dried curable composition, is then at least partially cured to provide the shaped abrasion-resistant multilayer optical film.

The urethane (meth)acrylate compound contributes to the conformability and flexibility of the cured composition, and hence its suitability for thermoforming. Exemplary urethane (meth)acrylate compounds having an average (meth)acrylate functionality of 2 to 4.8 are available from commercial sources, and/or can be prepared according to known methods. In some preferred embodiments, the urethane (meth)acrylate compounds having an average (meth)acrylate functionality of 2 to 4.3, 2.3 to 4.3, or even 2.5 to 4.1. The urethane (meth)acrylate compound may be a pure compound or a mixture of pure compounds. In some instances, urethane (meth)acrylate compounds with higher and lower average (meth)acrylate functionalities may be combined to achieve an average (meth)acrylate functionality of 2 to 4.8, or another desired value.

In some embodiments, the urethane (meth)acrylate compound comprises a reaction product of a biuret adduct of hexamethylene diisocyanate (HDI) or a isocyanurate adduct of HDI with hydroxyethyl acrylate or a combination of hydroxyethyl acrylate and pentaerythritol triacrylate that has an average (meth)acrylate functionality of 3.5 to 4.8.

In some embodiments, the urethane (meth)acrylate compound comprises a reaction product of a biuret adduct of hexamethylene diisocyanate (HDI) or a isocyanurate adduct of HDI with hydroxyethyl acrylate or a combination of hydroxyethyl acrylate and pentaerythritol triacrylate that has an average (meth)acrylate functionality of 3.5 to 4.8, and a molecular weight of 1100 g/mole to 1300 g/mole.

In some embodiments, the urethane (meth)acrylate compound comprises a reaction product of a biuret adduct of hexamethylene diisocyanate (HDI) or a isocyanurate adduct of HDI with hydroxyethyl acrylate or a combination of hydroxyethyl acrylate and pentaerythritol triacrylate that has an average (meth)acrylate functionality of 3.5 to 4.8, a molecular weight of 1100 g/mole to 1300 g/mole, and an acrylate equivalent weight of 307 g/equivalent to 275 g/equivalent.

Useful, commercially available urethane (meth)acrylate compounds include EBECRYL 264 aliphatic urethane triacrylate, EBECRYL 265 aliphatic urethane triacrylate, EBECRYL 1258 aliphatic urethane triacrylate, EBECRYL 4100 aliphatic urethane triacrylate, EBECRYL 4101 aliphatic urethane triacrylate, EBECRYL 8412 aliphatic urethane acrylate (trifunctional), EBECRYL 4654 aliphatic urethane triacrylate, EBECRYL 4666 aliphatic urethane triacrylate, EBECRYL 4738 aliphatic allophanate urethane triacrylate, EBECRYL 4740 aliphatic allophanate urethane triacrylate, EBECRYL 8405 aliphatic urethane tetraacrylate, EBECRYL 8604 aliphatic urethane tetraacrylate, EBECRYL 4500 aromatic urethane tetraacrylate, EBECRYL 4501 aromatic urethane tetraacrylate, EBECRYL 4200 aliphatic urethane tetraacrylate, EBECRYL 4201 aliphatic urethane tetraacrylate, EBECRYL 8702 aliphatic urethane hexaacrylate, EBECRYL 220 aromatic urethane hexaacrylate, EBECRYL 221 aromatic urethane hexaacrylate, EBECRYL 2221 aromatic urethane hexaacrylate, EBECRYL 2221 aromatic urethane hexaacrylate, EBECRYL 5129 aliphatic urethane hexaacrylate, EBECRYL 1290 aliphatic urethane hexaacrylate, EBECRYL 1291 aliphatic urethane hexaacrylate, EBECRYL 8301-R aliphatic urethane hexaacrylate, EBECRYL 8602 aliphatic urethane acrylate (nonfunctional), all from Allnex, Brussels, Belgium; and CN929 trifunctional urethane acrylate and CN9006 aliphatic urethane acrylate (hexafunctional) from Sartomer Co., Exton, Pennsylvania.

In some embodiments, urethane (meth)acrylate compound(s) can be synthesized by reacting a polyisocyanate compound with a hydroxyl-functional (meth)acrylate compound. A variety of polyisocyanates may be utilized in preparing the urethane (meth)acrylate compound. As used herein, the term "polyisocyanate" means any organic compound that has two or more reactive isocyanate (—NCO) groups in a single molecule such as, for example, diisocyanates, triisocyanates, tetraisocyanates, and mixtures thereof. For improved weathering and diminished yellowing, the urethane (meth)acrylate compound(s) employed herein are preferably aliphatic and therefore derived from an aliphatic polyisocyanate.

In some preferred embodiments, the urethane (meth) acrylate compound is preferably a reaction product of hexamethylene diisocyanate (HDI), such as available from Covestro LLC, Pittsburgh, Pennsylvania as DESMODUR H, or a derivative thereof. These derivatives include, for example, polyisocyanates containing biuret groups, such as the biuret adduct of hexamethylene diisocyanate (HDI) available from Covestro LLC as DESMODUR N-100, polyisocyanates containing one or more isocyanurate rings

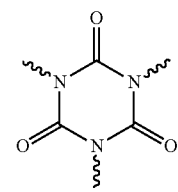

such as that available from Covestro LLC as DESMODUR N-3300, as well as polyisocyanates containing urethane groups, uretdione groups, carbodiimide groups, and/or allophanate groups. Yet another useful derivative, is a hexamethylene diisocyanate (HDI) trimer, available from Covestro LLC as DESMODUR N-3800. These derivatives are preferred as they are polymeric, exhibit very low vapor pressures and are substantially free of isocyanate monomer.

In some embodiments, urethane (meth)acrylate compound(s) is/are the reaction product(s) of a polyisocyanate such as a hexamethylene diisocyanate (HDI) derivative having an —NCO (i.e., isocyanate group) content of at least 10 percent, at least 15 percent, or even at least 20 weight percent. In some cases, HDI or other polyisocyanate may be reacted with hydroxyl-functional (meth)acrylate compounds and polyols. The —NCO content of the polyisocyanate is preferably not greater than 50 weight percent. On some embodiments, the polyisocyanate typically has an equivalent weight of at least 80, 100, 120, 140, 160, 180, or even 200 grams/per —NCO group. The equivalent weight is typically no greater than 500, 450, or 400 grams/per —NCO group and in some embodiments no greater than 350, 300, or 250 grams/per —NCO group, although this is not a requirement.

When aliphatic polyisocyanates comprising a cyclic group such as an isophorone diisocyanate (IPDI) derivative are used, the resulting cured composition can be less flexible (e.g., have poor thermoformability) and poor abrasion resistance.

The polyisocyanate is reacted with a hydroxyl-functional acrylate compound having the formula HOQ(A)$_p$; wherein Q is a divalent organic linking group, A is a (meth)acryl functional group —XC(=O)C(R$_2$)=CH$_2$ wherein X is O, S, or NR wherein R is H or C$_1$-C$_4$ alkyl, R$_2$ is a lower alkyl of 1 to 4 carbon atoms or H; and p is 1 to 6. The —OH group reacts with the isocyanate group forming a urethane linkage.

In some embodiments, the polyisocyanate can be reacted with a diol acrylate, such as a compound of the formula HOQ(A)Q$_1$Q(A)OH, wherein Q$_1$ is a divalent linking group and A is a (meth)acryl functional group as previously described. Representative compounds include hydantoin hexaacrylate (HHA) (e.g., see Example 1 of U.S. Pat. No. 4,262,072 (Wendling et al.), and H$_2$CH=C(CH$_3$)C(=O)OCH$_2$CH(OH)CH$_2$O(CH$_2$)$_4$OCH$_2$CH(OH)CH$_2$OC(=O)C(CH$_3$)=CH$_2$.

Q and Q$_1$ are independently a straight or branched chain or cycle-containing connecting group. Q can, for example, include a covalent bond, alkylene, arylene, aralkylene, or alkarylene. Q can optionally include heteroatoms such as O, N, and S, and combinations thereof. Q can also optionally include a heteroatom-containing functional group such as carbonyl or sulfonyl, and combinations thereof. In one embodiment, the hydroxyl-functional acrylate compounds used to prepare the urethane (meth)acrylate compound are monofunctional, such as in the case of hydroxyethyl acrylate, hydroxybutyl acrylate, and caprolactone monoacrylate, available as SR-495 from Sartomer Co. In this embodiment, p is 1.

In another embodiment, the hydroxyl-functional acrylate compounds used to prepare the urethane (meth)acrylate compound are multifunctional, such as the in the case of glycerol dimethacrylate, 1-(acryloxy)-3-(methacryloxy)-2-propanol, pentaerythritol triacrylate. In this embodiment, p is at least 2, at least 3, at least 4, at least 5, or at least 6.

In some embodiments, only monofunctional hydroxyl-functional acrylate compounds are utilized in the preparation of the urethane (meth)acrylate compound. In other embodiments, a combination of monofunctional and multifunctional hydroxyl-functional acrylate compounds are utilized in the preparation of the urethane (meth)acrylate compound. In some embodiments, the weight ratio of monofunctional hydroxyl-functional acrylate compound(s) to multifunctional hydroxyl-functional acrylate compound(s) ranges from 0.5:1 to 1:0.5. When the urethane (meth)acrylate compound is prepared from only multifunctional hydroxyl-functional acrylate compound(s), in some embodiments the resulting cured composition can be less flexible.

In some embodiments, some of the isocyanate groups on the polyisocyanate can be reacted with a polyol such as, for example, an alkoxylated polyol available from Perstorp Holding AB, Sweden as Polyol 4800. Such polyols can have a hydroxyl number of 500 to 1000 mg KOH/g and a molecular weight ranging from at least 200 or 250 g/mole up to 500 g/mole.

In some embodiments, some of the isocyanate groups on the polyisocyanate can be reacted with a polyol such as 1,6-hexanediol.

Selection of reaction conditions used to react the polyisocyanate with (meth)acrylated alcohols, and choice of catalyst if any, will be apparent to those of skill in the art. Further examples can be found in the Examples section hereinbelow.

Useful (meth)acrylate monomers (which are preferably non-urethane, and preferably non-silicone, although this is not a requirement) have a (meth)acrylate functionality of 1 to 2. These monomers may function as diluents or solvents, as viscosity reducers, as binders when cured, and as cross-linking agents, for example. Examples of useful (meth) acrylates include mono(meth)acrylates such as octyl (meth) acrylate, nonylphenol ethoxylate (meth)acrylate, isononyl (meth)acrylate, isobornyl (meth)acrylate, 2-(2-ethoxyethoxy)ethyl (meth)acrylate, 2-ethylhexyl (meth)acrylate, lauryl (meth)acrylate, beta-carboxyethyl (meth)acrylate, isobutyl (meth)acrylate, 2-hydroxyethyl (meth)acrylate, isodecyl (meth)acrylate, dodecyl(meth)acrylate, n-butyl (meth) acrylate, methyl (meth)acrylate, hexyl (meth)acrylate, (meth)acrylic acid, stearyl (meth)acrylate, hydroxy functional caprolactone ester (meth)acrylate, isooctyl (meth) acrylate, hydroxymethyl (meth)acrylate, hydroxypropyl (meth)acrylate, hydroxyisopropyl (meth)acrylate, hydroxybutyl(meth)acrylate, hydroxyisobutyl (meth)acrylate, tetrahydrofurfuiryl (meth)acrylate, and alkoxylated versions of the above (meth(acrylate monomers, such as alkoxylated tetrahydrofurfuryl (meth)acrylate and combinations thereof. Tetrahydrofurfuryl (meth)acrylate is preferred in some embodiments; di(meth)acrylates such as 1,6-hexanediol di(meth)acrylate, poly(ethylene glycol) di(meth)acrylates, polybutadiene di(meth)acrylates, polyurethane di(meth) acrylates, ethylene glycol di(meth)acrylate, hexanediol di(meth)acrylate, diethylene glycol di(meth)acrylate, triethylene glycol di(meth)acrylate, tetraethylene glycol di(meth) acrylate, neopentyl glycol di(meth)acrylate, alkoxylated versions of the above di(meth)acrylates, and combinations thereof. Of these, 1,6-hexanediol diacrylate is preferred in some embodiments. (Meth)acrylate monomers having a functionality of 1 or 2 (e.g., as listed above) are widely commercially available.

Exemplary useful silicone (meth)acrylates include mono- and polyfunctional silicone (meth)acrylates. Of these, silicone poly(meth)acrylates may be preferred because the likelihood of unbound silicone (meth)acrylate after curing is generally reduced. Exemplary silicone (meth)acrylates include EBECRYL 350 silicone diacrylate and EBECRYL 1360 silicone hexaacrylate from Allnex, CN9800 aliphatic silicone acrylate and CN990 siliconized urethane acrylate compound from Sartomer Co., and TEGO RAD 2100, TEGO RAD 2250, and TEGO RAD 2500 silicone polyether acrylate from Evonik Industries, Parsippany, New Jersey.

The curable composition may optionally, but preferably, further comprise an effective amount of photoinitiator. By the term "effective amount" is meant an amount that is at least sufficient amount to cause curing of the curable composition under ambient conditions. Typically, effective amounts of photoinitiator comprise less than 10 percent by weight, more typically less than 7 percent by weight, and more typically less than 3 percent by weight of the total curable composition. It will be recognized that curing may be complete even though polymerizable (meth)acrylate groups remain.

Exemplary photoinitiators include α-cleavage photoinitiators such as benzoin and its derivatives such as α-methylbenzoin; α-phenylbenzoin; α-allylbenzoin; α-benzylbenzoin; benzoin ethers such as benzil dimethyl ketal (available as IRGACURE 651 from Ciba Specialty Chemicals, Tarrytown, New York), benzoin methyl ether, benzoin ethyl ether, benzoin n-butyl ether; acetophenone and its derivatives such as 2-hydroxy-2-methyl-1-phenyl-1-propanone (available as DAROCUR 1173 from Ciba Specialty Chemicals) and 1-hydroxycyclohexyl phenyl ketone (available as IRGACURE 184 from Ciba Specialty Chemicals); 2-methyl-1-[4-(methylthio)phenyl]-2-(4-morpholinyl)-1-propanone (available as IRGACURE 907 from Ciba Specialty Chemicals); 2-benzyl-2-(dimethylamino)-1-[4-(4-morpholinyl)phenyl]-1-butanone (available as IRGACURE 369 from Ciba Specialty Chemicals); titanium complexes such as bis(η5-2,4-cyclopentadien-1-yl)bis[2,6-difluoro-3-(1H-pyrrol-1-yl)phenyl] titanium (available as CGI 784 DC from Ciba Specialty Chemicals); and mono- and bis-acylphosphines (available from Ciba Specialty Chemicals as IRGACURE 1700, IRGACURE 1800, IRGACURE 1850, and DAROCUR 4265). One useful photoinitiator, a difunctional alpha hydroxyketone, is available as ESACURE ONE from Lamberti S.p.A, Albizzate, Italy.

If an acylphosphine or acylphosphine oxide photoinitiator is utilized, it is typically combined with a photoinitiator (e.g., 2-hydroxy-2-methyl-1-phenyl-1-propanone) having a high extinction coefficient at one or more wavelengths of the actinic radiation. Such combination typically facilitates surface cure while maintaining low levels of costly photoinitiator.

Other useful photoinitiators include: anthraquinones (e.g., anthraquinone, 2-ethylanthraquinone, 1-chloroanthraquinone, 1,4-dimethylanthraquinone, 1-methoxyanthraquinone) and benzophenone and its derivatives (e.g., phenoxybenzophenone, phenylbenzophenone).

The curable composition may contain optional solvent, generally organic solvent, although water/solvent blends may be used. Exemplary optional solvents include hydrocarbons or halogenated hydrocarbons (e.g., toluene, cyclohexane, petroleum ether, lower alcohols (e.g., methanol, ethanol, propanol, and isopropanol), esters of aliphatic acids (e.g., ethyl acetate), ethers (e.g., tetrahydrofuran), and ketones (e.g., acetone and methyl ethyl ketone). The solvents can be used singly or in admixture. One skilled in the art can readily determine which solvent to use, and its amount.

The curable composition may also contain one or more optional additives such as, for example, fillers, thickeners, tougheners, pigments, fibers, tackifiers, lubricants, wetting agents, surfactants, antifoaming agents, dyes, coupling agents, plasticizers, and suspending agents.

In some embodiments, the curable composition further includes alpha alumina nanoparticles, preferably in an amount of 0.2 to 9 percent by weight (more preferably 0.2 to 3 percent by weight), based on the total weight of the curable composition.

Preferably, the alpha alumina nanoparticles have a particle size distribution with a Dv50 of from 0.05 to 1 micron. In some preferred embodiments, the alpha alumina nanoparticles have a particle size distribution with a Dv50 of 0.1 to 1 micron, 0.15 to 1 micron, 0.15 to 0.5 micron, or 0.2 to 0.3 micron. In some preferred embodiments, the alpha alumina nanoparticles have a polymodal distribution.

The alpha alumina nanoparticles comprise, preferably consist essentially of (e.g., are at least 99 weight percent), or even consist of, alumina in its alpha crystalline form. In some preferred embodiments, the alpha alumina nanoparticles have a particle size distribution with a Dv50 of greater than or equal to 0.21, 0.23, 0.25, 0.30, 0.40, or even 0.50 micron.

The alpha alumina nanoparticles can be made by milling larger size alpha alumina, for example, using a ball mill or a jet mill. If using a ball mill the milling media preferably comprises, or even consists of, alpha alumina, although other milling media such as, for example, aluminum zirconate media may be used.

Alpha alumina nanoparticles, which may even be in the size range of having a particle size distribution with a Dv50 of from 0.1 to 1 micron, can be readily obtained from commercial sources. Suppliers include US Research Nanomaterials, Inc., Houston, Texas; Sisco Research Laboratories Pvt. Ltd., Mumbai, India; and Baikowski International Corp., Charlotte, North Carolina.

The curable composition may be coated onto a major surface of the MOF by any suitable technique including, for example, spray coating, roll coating, gravure coating, slot coating, knife coating, bar coating, and dip coating. If optional solvent is present, it is typically at least partially dried by evaporation of some, or all, of the solvent (e.g., using a forced air oven or other heating means).

Next, the optionally at least partially dried, curable composition is at least partially cured, preferably fully cured to provide the shaped abrasion-resistant multilayer optical film. Curing may be accomplished using heat if the curable composition comprises a thermal initiator (e.g., a peroxide initiator), particulate radiation (e.g., e-beam), or photocuring (e.g., using ultraviolet and/or visible wavelengths of electromagnetic radiation). Techniques for such curing technologies are well-known in the art and are within the capability of the skilled artisan.

Infrared-reflecting multilayer optical films are well known and can be made according to known methods or obtained from commercial suppliers such as, for example, 3M Company, St. Paul, Minnesota.

Multilayer optical films (including reflective polarizers and mirrors) can be made by coextrusion of alternating polymer layers having different refractive indices, for example, as described in U.S. Pat. No. 5,882,774 (Jonza et al.); U.S. Pat. No. 6,045,894 (Jonza et al.); U.S. Pat. No. 6,368,699 (Gilbert et al.); U.S. Pat. No. 6,531,230 (Weber et al.); U.S. Pat. No. 6,667,095 (Wheatley et al.); U.S. Pat. No. 6,783,349 (Neavin et al.); 7,271,951 B2 (Weber et al); U.S. Pat. No. 7,632,568 (Padiyath et al.); and U.S. Pat. No. 7,652,736 (Padiyath et al.); U.S. Pat. No. 7,952,805 (McGurran et al.); and PCT Publications WO 95/17303 (Ouderkirk et al.) and WO 99/39224 (Ouderkirk et al.). In some embodiments, the MOF is at least 30, 40, 50, 60, 70, 80, or even at least 90 percent reflective to wavelengths in the range 400 nm to 700 nm (visible-light-reflective) or 700 nm to at least 1500 nm (infrared-light-reflective), and more preferably 700 nm to 2500 nm (infrared light-reflective), although this is not a requirement.

Once the abrasion-resistant multilayer optical film is prepared it is shaped by thermoforming using a female mold to create a shaped abrasion-resistant multilayer optical film.

Referring now to FIG. 1, exemplary shaped abrasion-resistant multilayer optical film 100 has abrasion-resistant layer 120, multilayer optical film 125, radius of curvature 130, and maximum depth 140. Abrasion-resistant layer 120 is disposed against the female mold surface during thermoforming, and hence is disposed on the convex surface in the finished article. Alternatively, or in addition, the abrasion-resistant layer can be on the concave side of the finished article.

Thermoforming is a manufacturing process whereby a plastic film is heated to a pliable forming temperature, formed to a specific shape in a mold (also mold insert or mold block), and trimmed to create a usable product. In practice, a mold having a desired mold shape is mounted to a thermoforming apparatus. According to the present disclosure, a female mold having a concave mold surface is used. The abrasion-resistant multilayer optical film is heated to a high-enough temperature that permits it to be stretched into the mold and cooled to a finished shape. Its simplified version is vacuum forming. Suitable thermoforming techniques are well known to those of skill in the art.

The female mold consists of a recessed cavity or cavities formed in a mold block. This is the most common mold form because it is easy to clamp the heated sheet across the unobstructed mold face. The resulting product has a clearly defined male form and an imprecise female form. Often the simplicity of the female mold outweighs the cosmetic requirements of the product, so that it is common to see packaging products such as nest-type box liners in which the recessed presentation face is the imprecise second surface.

The female mold has at least one radius of curvature (e.g., a spherical radius of curvature, a cylindrical radius of curvature, or a toric radius of curvature) in the range of 58 to 76 millimeters (mm), in some embodiments 65 to 68 mm, and in some preferred embodiments 66 to 67 mm. In addition, the region with the foregoing radius of curvature has a maximum depth of 13 to 20 mm, in some embodiments, 15 to 20 mm, or even 18 to 19 mm.

Typically, the cross-section will be parallel to the thickness dimension of the mold, although this is not a requirement. In some embodiments, a spherical radius of curvature is preferred.

It is often advantageous in thermoforming to pre-stretch the heated sheet immediately prior to forming it in the mold. There are two principal reasons for this. First, particularly when simple vacuum forming is combined with solid phase forming, the available force may be insufficient to stretch and form the sheet efficiently. A second reason is that some shapes, for example cup or box forms of relatively high aspect ratio, give rise to excessive variations in wall thickness when formed without pre-stretch. This arises because the sheet touches down first on the edges and side walls of the mold cavity and then perhaps in the center of the base. The combined mechanisms of chilling and friction tend to anchor the sheet in these positions so that all the remaining deformation needed to complete the forming is contributed by a minor proportion of the sheet area. In this case, the remedy may be selective pre-stretching in a manner related to the geometry of the mold form.

Selective pre-stretching is achieved by means of specially shaped plugs which are mechanically advanced into the heated sheet to produce local stretching in a way calculated to counteract the thinning tendency imposed by the mold geometry. The technique is generally referred to as plug assist. The plug shape exerts a considerable influence on wall thickness variation. Plug design is as much an art as a science. A blunt-nosed plug tends to produce articles with a thick base and thinner sidewalls. Tapered can-like plugs, on the other hand, produce a forming with thicker and stronger corners. Plug design must be optimized for each individual application but the general rule is for smooth surfaces and blended shapes without sharp transitions in form. The coefficient of friction for heated polypropylene sheet is relatively high, so plugs should be made from low-friction materials. The usual choices are polyamide, PTFE, or filled epoxy resins.

When the sheet pre-stretch is to be generalized over the whole sheet rather than localized in the area of individual mold features, the effect is achieved either by partial vacuum or positive air pressure. In both cases, a low pressure differential and a controlled flow rate is employed to inflate the sheet without causing excessive thinning or rupture. Pre-stretch by positive air pressure is often referred to as billow. The air pressure is sometimes generated by the piston effect, produced by advancing a mold towards the sheet. This pre-stretch technique is generally known as air slip. Some processes combine plug and billow pre-stretch techniques.

All forms of pre-stretch tend to modify orientation in the formed part. When forming is performed without pre-stretch, the orientation depends very much on the mold form geometry. Clearly, the situation is complex, but the tendency is for uniaxial orientation to predominate in the product sidewalls, while biaxial orientation is prevalent in regions that remain substantially parallel to the plane of the original sheet. These patterns are superimposed on whatever residual orientation remains in the sheet after heating. Pre-stretch changes the picture somewhat. The billow process imposes an overall biaxial orientation on the sheet which is later modified by the forming process. Plug pre-stretch, on the other hand, tends to emphasize the orientation patterns arising from forming.

Hardcoats on thermoplastic films (e.g., MOFs) may be assessed for their thermoformability by thermoforming them with a female mold having an 8 base lens shape (a spherical radius of curvature 66.25 millimeters and a maximum depth of 18.5 millimeters) and determining the amount of cracking of the hardcoat from the center of the lens shape to the edges of the lens shape. Preferred embodiments exhibit no cracking anywhere on the lens shape. If the coating on the lens shape cracks, the crack usually starts at the center. For example, if a crack starts at the center and continues 20% of the distance between the center and the edge of the lens shape, then cracking is reported as 20% from the center. Once a lens shape is thermoformed, generally there is no further cracking when this lens shape is used in further molding operations.

SELECT EMBODIMENTS OF THE PRESENT DISCLOSURE

In a first embodiment, the present disclosure provides a method of making an abrasion-resistant reflective polarizer film, the method comprising steps:
i) providing a curable composition comprising components:
  a) 87 to 96 weight percent of urethane (meth)acrylate compound having an average (meth)acrylate functionality of 2 to 4.8, based on the total weight of components a) to d);
  b) 2 to 12.5 weight percent of (meth)acrylate monomer having a (meth)acrylate functionality of 1 to 2, based on the total weight of components a) to d), wherein the (meth)acrylate monomer does not comprise a urethane (meth)acrylate compound;
c) optional 0.5 to 2 weight percent of silicone (meth) acrylate, based on the total weight of components a) to d);
d) optional effective amount of photoinitiator;
e) optional inorganic nanoparticles; and
f) optional solvent;
ii) coating the curable composition onto a major surface of a multilayer optical film;
iii) optionally at least partially drying the curable composition to provide an at least partially dried curable composition;
iv) at least partially curing the curable composition or the at least partially dried curable composition to provide an abrasion-resistant multilayer optical film; and
v) thermoforming the abrasion-resistant multilayer optical film using a female thermoforming mold having a mold surface, wherein at least a portion of the mold surface has a radius of curvature of 58 to 76 millimeters and a maximum depth of 13 to 20 mm, to provide the shaped abrasion-resistant multilayer optical film.

In a second embodiment, the present disclosure provides a method according to the first embodiment, wherein the at least a portion of the mold surface has a radius of curvature of 65 to 68 millimeters.

In a third embodiment, the present disclosure provides a method according to the first embodiment, wherein the at least a portion of the mold surface has a radius of curvature of 66 to 67 millimeters.

In a fourth embodiment, the present disclosure provides a method according to any one of the first to third embodiments, wherein component d) is present in the curable composition.

In a fifth embodiment, the present disclosure provides a method according to any one of the first to fourth embodiments, wherein component e) is present in the curable composition.

In a sixth embodiment, the present disclosure provides a method according to the fifth embodiment, wherein the inorganic nanoparticles comprise α-alumina nanoparticles.

In a seventh embodiment, the present disclosure provides a method according to any one of the first to sixth embodiments, wherein component b) comprises at least one of 1,6-hexanediol di(meth)acrylate or an alkoxylated tetrahydrofurfuryl (meth)acrylate.

In an eighth embodiment, the present disclosure provides a method according to any one of the first to seventh embodiments, wherein the urethane (meth)acrylate compound includes at least one of an isocyanurate ring or a biuret group.

In a ninth embodiment, the present disclosure provides a method according to any one of the first to eighth embodiments, wherein the multilayer optical film is a reflective polarizer film.

In a tenth embodiment, the present disclosure provides a method according to the ninth embodiment, wherein the reflective polarizer film comprises an optical stack, and wherein the major surface of the reflective polarizer film comprises a layer that is coextruded with the optical stack.

In an eleventh embodiment, the present disclosure provides a method according to any one of the first to tenth embodiments, wherein the multilayer optical film is opposite the mold surface during thermoforming.

In a twelfth embodiment, the present disclosure provides a method according to any one of the first to eleventh embodiments, wherein the maximum depth is 15 to 20 mm.

In a thirteenth embodiment, the present disclosure provides a method according to any one of the first to eleventh embodiments, wherein the maximum depth is 18 to 19 mm.

In a fourteenth embodiment, the present disclosure provides an abrasion-resistant multilayer optical film made by a method according to any one of the first to thirteenth embodiments.

EXAMPLES

Unless otherwise noted, all parts, percentages, ratios, etc. in the Examples and the rest of the specification are by weight.

Materials Used in the Examples

| DESIGNATION | DESCRIPTION |
|---|---|
| DESN100 | DESMODUR N100 biuret-based hexamethylene diisocyanate oligomer, 100% solids, 22.0 wt. % NCO, 191 g/eq., obtained from Covestro LLC, Pittsburgh, Pennsylvania |
| HEA | 2-hydroxyethyl acrylate, obtained from Alfa Aesar, Tewksbury, Massachusetts |
| PETA | Pentaerythritol triacrylate, obtained from Sartomer Co., Exton, Pennsylvania, as SR444C |
| HDDA | 1,6-hexanediol diacrylate, obtained from Sartomer Co. as SR238B |
| MEK | Methyl ethyl ketone |
| MP | 1-methoxy-2-propanol |
| APF FILM | a reflective polarizer MOF as described in Example 3 of PCT Application PCT/IB2018/051186, filed Feb. 26, 2018 and entitled "High Contrast Optical Film and Devices Including the Same" |
| ESACURE ONE | Photoinitiator, obtained from Lamberti USA, Conshohocken, Pennsylvania |
| SR611 | Alkoxylated tetrahydrofurfuryl acrylate monomer from Sartomer Co. |
| 4-hydroxy TEMPO | 4-Hydroxy-2,2,6,6-tetramethylpiperidine 1-oxyl, available from Sigma-Aldrich, St. Louis, Missouri |
| MEHQ | 4-methoxy phenol, available from Sigma-Aldrich |
| TEG2100 | TEGORAD 2100 silicone acrylate, obtained from Evonik Industries, Essen, Germany |
| DBTDL | Dibutyltin dilaurate available from Sigma-Aldrich |
| CN9039 | Aliphatic urethane acrylate oligomer from Sartomer Co. |
| EB 8301R | Aliphatic urethane acrylate oligomer from Allnex, Alpharetta, Georgia |
| CN9010 | Aliphatic urethane acrylate oligomer from Sartomer Co. |
| CN968 | Aliphatic urethane acrylate oligomer from Sartomer Co. |
| GEN 4690 | Aliphatic urethane acrylate oligomer from Rahn USA Corp., Aurora, Illinois |
| EB 1290 | Aliphatic urethane acrylate oligomer from Allnex |
| CN9006 | Aliphatic urethane acrylate oligomer from Sartomer Co. |
| CN9025 | Aliphatic urethane acrylate oligomer from Sartomer Co. |
| EB 4858 | Aliphatic urethane acrylate oligomer from Allnex |
| EB 8604 | Aliphatic urethane acrylate oligomer from Allnex |
| BYK-W 9012 | Copolymer with acidic groups for improving wetting and dispersing properties of aluminum trihydroxide, from BYK USA, Wallingford, Connecticut |
| Alpha alumina Nano Powder | 26N-0811UPA from Inframat, Manchester, Connecticut |

Preparative Example, Polyurethane Acrylate PUA9 DESN100-0.5 PETA-0.5 HEA

A 250-mL jar equipped with a magnetic stir bar was charged with 39.76 g (0.2082 eq.) of DESN 100, 25 g of MEK, 12.33 g (0.1062 eq.) of HEA, 47.91 g (0.1062 eq.) of PETA, for a total of 1.01 eq. OH per eq. of NCO, 0.025 g (250 ppm) BHT, 0.005 g (50 ppm) of 4-hydroxy TEMPO, and 0.05 g (500 ppm) of DBTDL. The jar was placed in a water bath at room temperature and allowed to stir for 10 min. After 10 min., it was placed into a 55° C. bath for 4 hr. At the end of that time, the reaction mixture was monitored by Fourier Transform Infrared Spectroscopy (FTIR) and found to have no NCO peak at 2265 cm$^{-1}$. The resulting material was 80 wt. % solids.

Polyurethane Acrylate Preparative Examples PUA1-PUA8 and PUA10-PUA19

PUA1-PUA8 and PUA10-PUA19 were prepared in the same manner as PUA9 described above by reacting the preparations reported in Table 1. The reactions were carried out using an appropriately sized jar. The amount of materials used in preparations described in Table 1 were reported in grams (g) and unless noted otherwise, further included 250 ppm BHT, 50 ppm TEMPO, and 500 ppm DBTDL with respect to solids. The resulting products were 80 wt. % solids in MEK wherein eq. indicates equivalents.

The average ((meth)acrylate) functionality of the polyurethane acrylates (PUAs) was calculated in the following fashion. The functionality of the added acrylates for each compound was first calculated. For instance, the PUA6 above was designated as 1.0 DESN100+0.25 HEA+0.75 PETA. This means that the compound was the reaction product of 1 equivalent of isocyanate groups (as DESN100) and 0.25 hydroxyl equivalents of hydroxyethyl acrylate and 0.75 hydroxyl equivalents of PETA. The HEA has 1 acrylate group per hydroxyl group and the PETA has 3 acrylate groups per hydroxyl group. The functionality of added acrylates for this compound was then (0.25·1)+(0.75·3) or 2.5. The average (meth)acrylate functionality was found by multiplying the functionality of the added acrylates for each compound by the average functionality of the polyisocyanate. According to the vendor Covestro, the average functionality for DESN100 was 3.6, so the average (meth)acrylate functionality for the compound was 2.5·3.6 or 9. The summary of average ((meth)acrylate) functionality is reported in Table 1 (above).

The molecular weight of the PUAs in grams per mole was calculated in the following fashion, illustrating with PUA6. The average functionality of DESN100 was 3.6. This was multiplied by the equivalent fraction of DESN100, which was 1.0, times 3.6, which was the average functionality of DESN100, times the equivalent weight (EW) of DESN100, which was 190.9 g/eq. This was the contribution of DESN100 to the molecular weight. We multiplied the equivalent fraction of HEA, which was 0.25, times 3.6, which was the average functionality of DESN100, times the EW of HEA, which was 116.12 g/eq. This was the contribution of HEA to the molecular weight. We multiplied the equivalent fraction of PETA, which was 0.75, times 3.6, which was the average functionality of DESN100, times the EW of PETA, which was 451.3 g/eq. This was the contribution of PETA to the molecular weight. The sum of the contributions of DESN100, HEA, and PETA was the molecular weight. The overall calculation is: 1.0·3.6·190.9+ 0.25·3.6·116.12+0.75·3.6·451.3=2010 g/mole. A summary of these calculations is reported in Table 2, below.

| URETHANE ACRYLATE | DESN100, eq. | HEA, eq. | PETA, eq. | DESN100, g | HEA, g | PETA, g | MEK, g | Average (Meth)acrylate Functionality | Molecular Weight, g/mole | Acrylate Eq. Wt., g/eq. |
|---|---|---|---|---|---|---|---|---|---|---|
| PUA1 | 1.00 | 0.0 | 1.0 | 29.32 | 0 | 70.68 | 25.0 | 10.8 | 2312 | 214 |
| PUA2 | 1.00 | 0.05 | 0.95 | 87.63 | 51.66 | 10.71 | 37.5 | 10.4 | 2252 | 216 |
| PUA3 | 1.00 | 0.10 | 0.90 | 83.20 | 46.46 | 20.34 | 37.5 | 10.1 | 2191 | 217 |
| PUA4 | 1.00 | 0.15 | 0.85 | 79.19 | 41.77 | 29.04 | 37.5 | 9.7 | 2131 | 219 |
| PUA5 | 1.00 | 0.20 | 0.80 | 75.55 | 37.50 | 36.95 | 37.5 | 9.4 | 2071 | 221 |
| PUA6 | 1.00 | 0.25 | 0.75 | 33.75 | 5.23 | 61.01 | 25.0 | 9.0 | 2010 | 223 |
| PUA7 | 1.00 | 0.33 | 0.67 | 213.18 | 44.09 | 342.73 | 150.0 | 8.4 | 1914 | 227 |
| PUA8 | 1.00 | 0.42 | 0.58 | 225.12 | 58.20 | 316.68 | 150.0 | 7.8 | 1805 | 232 |
| PUA9 | 1.00 | 0.50 | 0.50 | 39.76 | 12.33 | 47.91 | 25.0 | 7.2 | 1709 | 237 |
| PUA10 | 1.00 | 0.55 | 0.45 | 247.27 | 84.39 | 268.34 | 150.0 | 6.8 | 1648 | 241 |
| PUA11 | 1.00 | 0.58 | 0.42 | 253.50 | 91.76 | 254.73 | 150.0 | 6.6 | 1612 | 243 |
| PUA12 | 1.00 | 0.60 | 0.40 | 256.75 | 95.59 | 247.67 | 150.0 | 6.5 | 1588 | 245 |
| PUA13 | 1.00 | 0.67 | 0.33 | 270.57 | 111.93 | 217.50 | 150.0 | 6.0 | 1503 | 252 |
| PUA14 | 1.00 | 0.75 | 0.25 | 48.37 | 22.50 | 29.14 | 25.0 | 5.4 | 1407 | 261 |
| PUA15 | 1.00 | 0.80 | 0.20 | 48.70 | 6.04 | 95.26 | 37.5 | 5.0 | 1347 | 267 |
| PUA16 | 1.00 | 0.85 | 0.15 | 47.30 | 4.40 | 98.30 | 37.5 | 4.7 | 1286 | 275 |
| PUA17 | 1.00 | 0.90 | 0.10 | 45.97 | 2.85 | 101.17 | 37.5 | 4.3 | 1226 | 284 |
| PUA18 | 1.00 | 0.95 | 0.05 | 44.42 | 1.38 | 104.21 | 37.5 | 4.0 | 1166 | 294 |
| PUA19 | 1.00 | 1.00 | 0.00 | 61.96 | 38.04 | 0 | 25.0 | 3.6 | 1105 | 307 |

| URETHANE ACRYLATE | DESN100 Equivalents | DESN100 Equivalent Weight, g | Functionality | HEA Equivalents | HEA Equivalent Weight, g | PETA Equivalents | PETA Equivalent Weight, g | Molecular Weight, g/mole |
|---|---|---|---|---|---|---|---|---|
| PUA1 | 1.00 | 190.9 | 3.6 | 0.0 | 116.12 | 1.0 | 451.3 | 2312 |
| PUA2 | 1.00 | 190.9 | 3.6 | 0.05 | 116.12 | 0.95 | 451.3 | 2252 |
| PUA3 | 1.00 | 190.9 | 3.6 | 0.10 | 116.12 | 0.90 | 451.3 | 2191 |
| PUA4 | 1.00 | 190.9 | 3.6 | 0.15 | 116.12 | 0.85 | 451.3 | 2131 |
| PUA5 | 1.00 | 190.9 | 3.6 | 0.20 | 116.12 | 0.80 | 451.3 | 2071 |
| PUA6 | 1.00 | 190.9 | 3.6 | 0.25 | 116.12 | 0.75 | 451.3 | 2010 |
| PUA7 | 1.00 | 190.9 | 3.6 | 0.33 | 116.12 | 0.67 | 451.3 | 1914 |
| PUA8 | 1.00 | 190.9 | 3.6 | 0.42 | 116.12 | 0.58 | 451.3 | 1805 |
| PUA9 | 1.00 | 190.9 | 3.6 | 0.50 | 116.12 | 0.50 | 451.3 | 1709 |
| PUA10 | 1.00 | 190.9 | 3.6 | 0.55 | 116.12 | 0.45 | 451.3 | 1648 |
| PUA11 | 1.00 | 190.9 | 3.6 | 0.58 | 116.12 | 0.42 | 451.3 | 1612 |

-continued

| URETHANE ACRYLATE | DESN100 Equivalents | DESN100 Equivalent Weight, g | Functionality | HEA Equivalents | HEA Equivalent Weight, g | PETA Equivalents | PETA Equivalent Weight, g | Molecular Weight, g/mole |
|---|---|---|---|---|---|---|---|---|
| PUA12 | 1.00 | 190.9 | 3.6 | 0.60 | 116.12 | 0.40 | 451.3 | 1588 |
| PUA13 | 1.00 | 190.9 | 3.6 | 0.67 | 116.12 | 0.33 | 451.3 | 1503 |
| PUA14 | 1.00 | 190.9 | 3.6 | 0.75 | 116.12 | 0.25 | 451.3 | 1407 |
| PUA15 | 1.00 | 190.9 | 3.6 | 0.80 | 116.12 | 0.20 | 451.3 | 1347 |
| PUA16 | 1.00 | 190.9 | 3.6 | 0.85 | 116.12 | 0.15 | 451.3 | 1286 |
| PUA17 | 1.00 | 190.9 | 3.6 | 0.90 | 116.12 | 0.10 | 451.3 | 1226 |
| PUA18 | 1.00 | 190.9 | 3.6 | 0.95 | 116.12 | 0.05 | 451.3 | 1166 |
| PUA19 | 1.00 | 190.9 | 3.6 | 1.00 | 116.12 | 0.00 | 451.3 | 1105 |

The acrylate equivalent weight of the PUAs was calculated by dividing the molecular weight of the polyurethane by the average ((meth)acrylate) functionality. To illustrate with PUA6, that is 2010/9=223.33.

Preparative Examples 1-6 (PE1-PE6) and Comparative Examples 1-23 (CE1-CE23)

Coating solutions of the respective polyurethane acrylates PUA1-PUA19 and a few commercial urethane acrylates such as CN9039 were prepared by mixing components as reported in Table 3 to prepare coating solutions for making preparatory film examples. Then, to prepare each preparative or comparative example, the indicated coating solution composition in Table 3 was coated at 32 weight percent solids onto APF FILM. The coating was done using a No. 7 wire-wound rod (available from RD Specialties, Webster, New York). The coating was dried at 90° C. for 1.5 min. The dried coating was then cured using an ultraviolet (UV) processor equipped with an H-type bulb (500 W, available from Heraeus Noblelight America/Fusion UV Systems, Gaithersburg, Maryland) at 10000 power under nitrogen at 50 feet/minute (15.2 m/min). The cured coating had an estimated thickness of about 3.4 micrometers.

Film Thermoforming & Molding of Base Lenses

The abrasion-resistant multilayer optical film was formed using an AccuForm thermoforming system, available Hy-Tech Forming Systems (USA), Inc. The system uses heat and high pressure to form to the tool geometry used. A female mold having 8 base lens geometry (corresponding to a 66.25 mm spherical radius of curvature and a maximum depth of 18.5 mm) was used. The film was clamped in the AccuForm system, heated to 350° F. (177° C.), and pressurized air was applied to the top of the film to force it into the lens tool geometry. The film was cooled and the form film was removed from the system.

The formed film was inspected visually for cracks in the film hard coat. The method used was to record the percent of the radius at any point that was cracked so if there was cracking that extended from the center of the lens for 5000 of the radius the result was recorded as extent of crack is 50%.

The Formed film was trimmed to the final molded lens size and an injection molding process was used to insert mold the film on one side of the final 8 base lens geometry.

TABLE 3

| PREPARATIVE EXAMPLES PE1-PE4 AND COMPARATIVE EXAMPLES CE1-CE15 | CHARGE, g | SOLIDS, g | SOLVENT, g | WEIGHT PERCENT SOLIDS | WEIGHT PERCENT OF COATING SOLUTION |
|---|---|---|---|---|---|
| URETHANE ACRYLATE | 9.33 | 7.464 | 1.866 | 93.3 | 37.32 |
| HDDA | 0.16 | 0.16 | | 2.00 | 0.64 |
| SR611 | 0.16 | 0.16 | | 2.00 | 0.64 |
| TEG2100 | 0.056 | 0.056 | | 0.70 | 0.22 |
| ESACURE ONE | 0.16 | 0.16 | | 2.00 | 0.64 |
| MP | 15.134 | | 15.134 | 0.00 | 60.54 |
| PREPARATIVE EXAMPLES PE5-PE6 AND COMPARATIVE EXAMPLES CE16-CE23 | | | | | |
| URETHANE ACRYLATE | 7.464 | 7.464 | | 93.3 | 29.86 |
| HDDA | 0.16 | 0.16 | | 2.00 | 0.64 |
| SR611 | 0.16 | 0.16 | | 2.00 | 0.64 |
| TEG2100 | 0.056 | 0.056 | | 0.7 | 0.22 |
| ESACURE ONE | 0.16 | 0.16 | | 2.00 | 0.64 |
| MP | 17 | | 17 | | 68.00 |

The injection molding was performed by a 65 ton press from KraussMaffei Technologies GmbH and the molding resin used was Mitsubishi Gas Chemical Company Optimas 7500 (PMMA) resin.

Results are reported in Table 4, below.

TABLE 4

| FILM | SOURCE (URETHANE ACRYLATE) | THERMOFORMING RESULT, EXTENT OF CRACKING 8 BASE LENS FORM, % |
|---|---|---|
| CE1 | PUA1 | 95 |
| CE2 | PUA2 | 90 |
| CE3 | PUA3 | 85 |
| CE4 | PUA4 | 80 |
| CE5 | PUA5 | 75 |
| CE6 | PUA6 | 75 |
| CE7 | PUA7 | 75 |
| CE8 | PUA8 | 75 |
| CE9 | PUA9 | 75 |
| CE10 | PUA10 | 60 |
| CE11 | PUA11 | 15 |
| CE12 | PUA12 | 20 |
| CE13 | PUA13 | 5 |
| CE14 | PUA14 | 10 |
| CE15 | PUA15 | 5 |
| PE1 | PUA16 | 0 |
| PE2 | PUA17 | 0 |
| PE3 | PUA18 | 0 |
| PE4 | PUA19 | 0 |
| CE16 | CN9039 | 100 |
| CE17 | EB 8301R | 100 |
| CE18 | CN9010 | 100 |
| CE19 | CN968 | 100 |
| CE20 | GEN 4690 | 100 |
| CE21 | EB 1290 | 100 |
| CE22 | CN9006 | 100 |
| CE23 | CN9025 | 60 |
| PE5 | EB 4858 | 0 |
| PE6 | EB 8604 | 0 |
| PE7 | UNCOATED APF FILM | 0 |

Abrasion Test

Abrasion of lens samples was tested using a Taber model 5750 Linear Abraser (Taber Industries, North Tonawanda, New York). The collet oscillated at 40 cycles/minute. The abrasive material used for this test was an eraser insert (obtained from Summers Optical, a division of EMS Acquisition Corp., Hatfield, Pennsylvania). The eraser insert had a diameter of 6.5 mm and met the requirements of military standard Mil-E-123971B.

The eraser insert was held in place through duration of test by the collet. A single sample was tested for each example with a total weight of 1.1 kg weight and 20 cycles. The linear abraser had a horizontal arm that reciprocated in a linear motion. Attached to the end of the arm was a ball-bearing spline shaft that created a free-floating system permitting vertical movement so that during the horizontal back and forth strokes, the collet could raise or lower to follow the lens contour. For the abrasion exposure, lens samples were mounted in a horizontal clamp so that the abraser tool could be moved across the lens sample with a total travel distance of 51 mm at a speed corresponding to a rate of 40 abrasion cycles per minute. After abrasion, the sample was cleaned of residue by wiping with a lens cleaning towelette (Radnor Products, Radnor, Pennsylvania). The effect of the abrasion cycles on the lens samples was determined by the measurement of percent haze of each sample, before and after the linear abrasion.

Percent haze was measured using a BYK Haze-Gard Plus haze meter (BYK Gardner, Columbia, Maryland). Lenses were positioned in such a manner that the light impinged against the concave side of the lens. Post-abrasion haze measurements were made through a flexible 5 mm×25 mm rectangular aperture to restrict the measurement to the area of each lens given the abrasion exposure. The delta haze value for each sample was calculated by subtracting the haze of an untested region of the sample.

Similarly, results for abrasion-resistant molded 8 base lens examples 1-6 (EX1-EX6), corresponding to the selected crack-resistant preparatory example thermoformed films PE1-PE6, and comparative example 24 (CE24), corresponding to PE7, are reported in Table 5, below.

TABLE 5

| EXAMPLE | SOURCE THERMOFORM | INITIAL (UNABRADED) % HAZE | POST-ABRASION % HAZE | DELTA HAZE |
|---|---|---|---|---|
| EX1 | PE1 | 0.74 | 17.2 | 16.5 |
| EX2 | PE2 | 0.72 | 16.3 | 15.6 |
| EX3 | PE3 | 0.83 | 23.5 | 22.7 |
| EX4 | PE4 | 0.77 | 21 | 20.2 |
| EX5 | PE5 | 0.85 | 38.9 | 38.1 |
| EX6 | PE6 | 0.96 | 29 | 28.0 |
| CE24 | PE7 | 0.54 | 51 | 50.5 |

The preceding description, given in order to enable one of ordinary skill in the art to practice the claimed disclosure, is not to be construed as limiting the scope of the disclosure, which is defined by the claims and all equivalents thereto.

What is claimed is:

1. A method of making a shaped abrasion-resistant multilayer optical film, the method comprising steps:
   i) providing a curable composition comprising components:
      a) 87 to 96 weight percent of urethane (meth)acrylate compound having an average (meth)acrylate functionality of 2 to 4.8, based on the total weight of components a) to d);
      b) 2 to 12.5 weight percent of (meth)acrylate monomer having a (meth)acrylate functionality of 1 to 2, based on the total weight of components a) to d), wherein the (meth)acrylate monomer does not comprise a urethane (meth)acrylate compound;
      c) 0.5 to 2 weight percent of silicone (meth)acrylate, based on the total weight of components a) to d);
      d) an effective amount of photoinitiator;
      e) optional inorganic nanoparticles; and
      f) optional solvent;
   ii) coating the curable composition onto a major surface of a multilayer optical film;
   iii) optionally at least partially drying the curable composition to provide an at least partially dried curable composition;
   iv) at least partially curing the curable composition or the at least partially dried curable composition to provide an abrasion-resistant multilayer optical film; and
   v) thermoforming the abrasion-resistant multilayer optical film using a female thermoforming mold having a mold surface, wherein at least a portion of the mold surface has a radius of curvature of 58 to 76 millimeters and a maximum depth of 13 to 20 mm, to provide the shaped abrasion-resistant multilayer optical film.

2. The method of claim 1, wherein the at least a portion of the mold surface has a radius of curvature of 65 to 68 millimeters.

3. The method of claim 1, wherein the at least a portion of the mold surface has a radius of curvature of 66 to 67 millimeters.

4. The method of claim 1, wherein component e) is present in the curable composition.

5. The method of claim 1, wherein the inorganic nanoparticles comprise α-alumina nanoparticles.

6. The method of claim 1, wherein component b) comprises at least one of 1,6-hexanediol di(meth)acrylate or an alkoxylated tetrahydrofurfuryl (meth)acrylate.

7. The method of claim 1, wherein the urethane (meth)acrylate compound includes at least one of an isocyanurate ring or a biuret group.

8. The method of claim 1, wherein the multilayer optical film is a reflective polarizer film.

9. The method of claim 8, wherein the reflective polarizer film comprises an optical stack, and wherein the major surface of the reflective polarizer film comprises a layer that is coextruded with the optical stack.

10. The method of claim 1, wherein the multilayer optical film is opposite the mold surface during thermoforming.

11. The method of claim 1, wherein the maximum depth is 15 to 20 mm.

12. The method of claim 1, wherein the maximum depth is 18 to 19 mm.

13. The method of claim 1, wherein the urethane (meth)acrylate compound includes a biuret group.

14. The method of claim 1, wherein the multilayer optical film comprises alternating polymer layers having different refractive indices, wherein each alternating polymer layer has an optical thickness of less than 1 micron.

15. The method of claim 1, wherein the multilayer optical film is at least 70 percent reflective to wavelengths in the range of 400 nm to 700 nm.

16. The method of claim 1, wherein the multilayer optical film is at least 50 percent reflective to wavelengths in the range of 700 nm to 2500 nm.

* * * * *